US012361298B2

(12) United States Patent
Kwatra et al.

(10) Patent No.: US 12,361,298 B2
(45) Date of Patent: Jul. 15, 2025

(54) DISPLAYING CONTEXTUAL INFORMATION OF MEDIA

(71) Applicant: INTERNATIONAL BUSINESS MACHINES CORPORATION, Armonk, NY (US)

(72) Inventors: Shikhar Kwatra, Raleigh, NC (US); Raghuveer Prasad Nagar, Kota (IN); Jeremy R. Fox, Georgetown, TX (US); Lisa Seacat DeLuca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 1049 days.

(21) Appl. No.: 16/987,808

(22) Filed: Aug. 7, 2020

(65) Prior Publication Data

US 2022/0044132 A1   Feb. 10, 2022

(51) Int. Cl.
G06N 5/04      (2023.01)
G06F 18/21     (2023.01)
G06F 18/214    (2023.01)
G06N 20/00     (2019.01)
G06V 10/40     (2022.01)

(52) U.S. Cl.
CPC ............ *G06N 5/04* (2013.01); *G06F 18/214* (2023.01); *G06F 18/2178* (2023.01); *G06N 20/00* (2019.01); *G06V 10/40* (2022.01)

(58) Field of Classification Search
CPC .......... G06N 5/04; G06N 20/00; G06N 3/088; G06F 18/214; G06F 18/2178; G06V 10/40; G06V 10/764; G06V 20/30
See application file for complete search history.

(56) References Cited

U.S. PATENT DOCUMENTS

| | | | |
|---|---|---|---|
| 7,474,759 B2 | 1/2009 | Sternberg | |
| 7,813,557 B1 | 10/2010 | Bourdev | |
| 9,015,139 B2 | 4/2015 | Wong | |
| 9,129,179 B1 | 9/2015 | Wong | |
| 2003/0033296 A1 | 2/2003 | Rothmuller | |
| 2009/0299988 A1 | 12/2009 | Hamilton, II | |
| 2014/0033240 A1* | 1/2014 | Card, II | H04N 21/4667 725/14 |
| 2014/0086458 A1 | 3/2014 | Rogers | |
| 2014/0122459 A1 | 5/2014 | Frigon | |

(Continued)

FOREIGN PATENT DOCUMENTS

CA       3080247 A1 *  5/2019  ............ G06Q 10/02

OTHER PUBLICATIONS

Zheng, Yan-Tao, et al. "Tour the world: building a web-scale landmark recognition engine." 2009 IEEE Conference on Computer Vision and Pattern Recognition. IEEE, 2009. (Year: 2009).*

(Continued)

*Primary Examiner* — Michael J Huntley
*Assistant Examiner* — Sehwan Kim
(74) *Attorney, Agent, or Firm* — Caleb D. Wilkes

(57) ABSTRACT

The exemplary embodiments disclose a method, a computer program product, and a computer system for determining the context of media. The exemplary embodiments may include a user consuming media, collecting data of the media, extracting one or more features from the collected data, and determining a media context based on the extracted one or more features and one or more models.

20 Claims, 6 Drawing Sheets

(56) References Cited

U.S. PATENT DOCUMENTS

| | | | | |
|---|---|---|---|---|
| 2015/0278691 | A1* | 10/2015 | Xia | G06F 16/951 706/14 |
| 2016/0350333 | A1 | 12/2016 | Sacheti | |
| 2017/0351417 | A1 | 12/2017 | Manico | |
| 2019/0340537 | A1* | 11/2019 | Fung | G06N 20/00 |
| 2020/0020001 | A1* | 1/2020 | Singh | H04W 4/021 |
| 2020/0211303 | A1* | 7/2020 | Walsh | G06N 7/01 |
| 2020/0252224 | A1* | 8/2020 | Tomaselli | G06F 40/10 |
| 2020/0271464 | A1* | 8/2020 | Zavesky | G01C 21/3492 |
| 2020/0320592 | A1* | 10/2020 | Soule | G06Q 30/0279 |
| 2021/0099571 | A1* | 4/2021 | Wambugu | H04W 4/021 |
| 2021/0124929 | A1* | 4/2021 | Chae | H04N 23/69 |
| 2021/0314670 | A1* | 10/2021 | Atluru | H04N 21/4318 |
| 2022/0005040 | A1* | 1/2022 | Edwards | G06Q 20/4016 |
| 2023/0043122 | A1* | 2/2023 | Shin | H04N 23/64 |

OTHER PUBLICATIONS

Noguera, José M., et al. "A mobile 3D-GIS hybrid recommender system for tourism." Information sciences 215 (2012): 37-52. (Year: 2012).*

Hays, James, and Alexei A. Efros. "Im2gps: estimating geographic information from a single image." 2008 ieee conference on computer vision and pattern recognition. IEEE, 2008. (Year: 2008).*

Acker, "Data Craft: The Manipulation of Social Media Metadata," Data & Society, datasociety.net/research/media-manipulation, 2014, pp. 1-26.

Disclosed Anonymously, "Video Stream Labeling and Embedded Tagging Methodology," IP.com Disclosure No. IPCOM000225911D, https://ip.com/IPCOM/000225911, Mar. 12, 2013, pp. 1-7.

Disclosed Anonymously, "Virtual touch of object in 3D Television," IP.com Disclosure No. IPCOM000226443D, https://ip.com/IPCOM/000226443, Apr. 3, 2013, pp. 1-5.

Https://www.nps.gov/stli/index.htm, "Statue of Liberty National Monument, New York," National Parks Service, Jun. 8, 2020, pp. 1-3.

https://www.prnewswire.com/news-releases/the-global-multimedia-chipsets-market-2018-2023-analysis-by-type-end-user-industry-and-region-300699342.html, "The Global Multimedia Chipsets Market (2018-2023) Analysis by Type, End-User Industry and Region," Research and Markets, Aug. 20, 2018, pp. 1-6.

Locker et al., "Crowd Sourcing for Adding TV Metadata," IP.com Disclosure No. IPCOM000203239D, https://ip.com/IPCOM/000203239, Jan. 20, 2011, pp. 1-2.

Mell et al., "The NIST Definition of Cloud Computing", National Institute of Standards and Technology, Special Publication 800-145, Sep. 2011, pp. 1-7.

* cited by examiner

DISPLAYING CONTEXTUAL INFORMATION OF MEDIA

BACKGROUND

The exemplary embodiments relate generally to digital media, and more particularly to displaying contextual information of digital media content.

Many people consume media of various forms without knowing everything about the contents of the media. For example, a user may watch a video showing a stadium and may not know the name of the stadium or where it is located. The user may wish to know this information about the stadium, but it can be inconvenient and tedious, if not impossible, for the user to search for this information without any contextual information about the stadium.

SUMMARY

The exemplary embodiments disclose a method, a computer program product, and a computer system for determining the context of media. The exemplary embodiments may include a user consuming media, collecting data of the media, extracting one or more features from the collected data, and determining a media context based on the extracted one or more features and one or more models.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
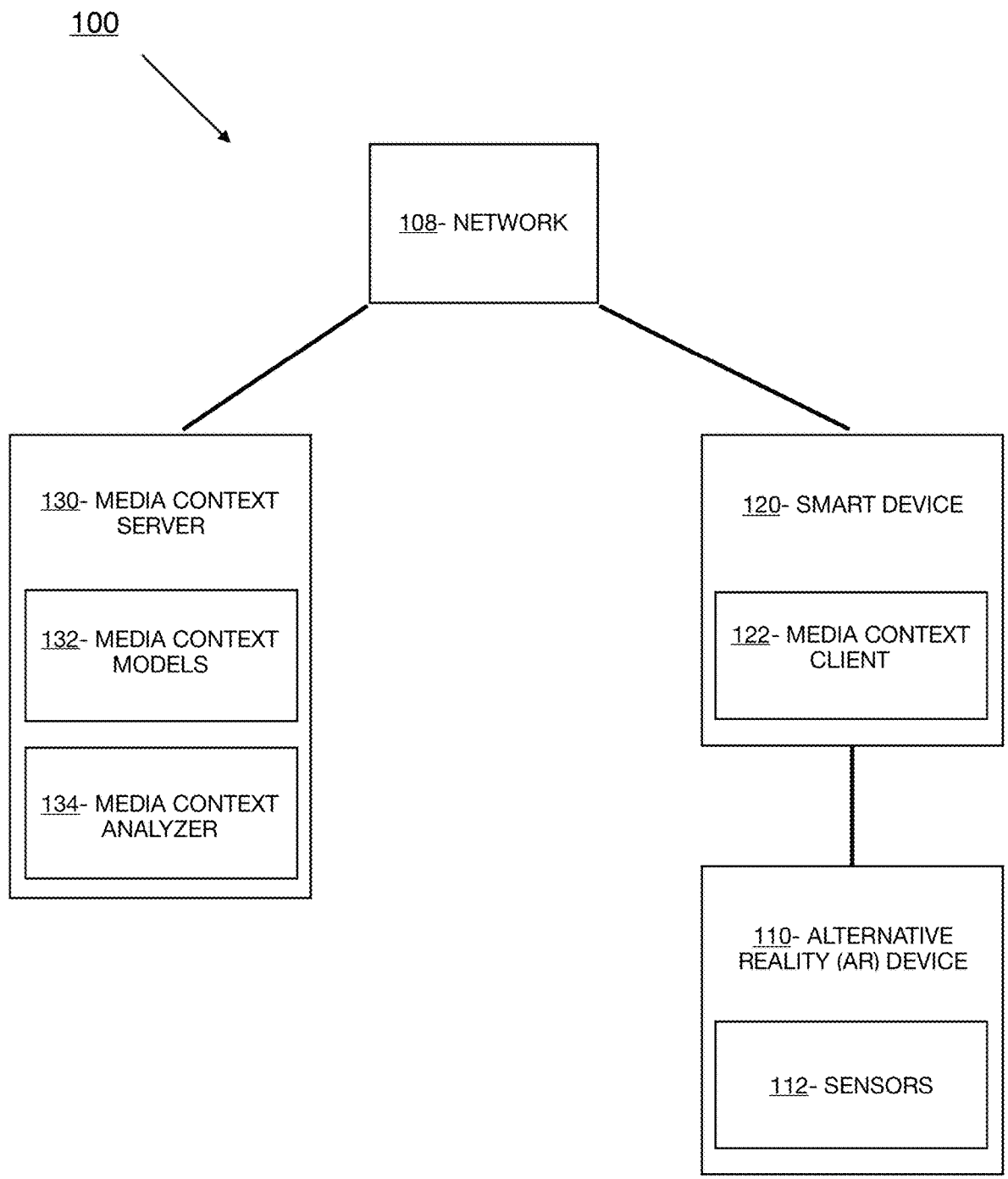
FIG. 1 depicts an exemplary schematic diagram of a media context display system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Many people consume media of various forms without knowing everything about the contents of the media. For example, a user may watch a video showing a stadium and may not know the name of the stadium or where it is located. The user may wish to know this information about the stadium, but it can be inconvenient and tedious, if not impossible, for the user to search for this information without any contextual information about the stadium.

Exemplary embodiments are directed to a method, computer program product, and computer system for displaying media context. In embodiments, machine learning may be used to create models capable of determining media context, while feedback loops may improve upon such models. Moreover, data from user uploads, databases, or the sensors 112 may be used to determine media context. A user may wish for media context to be displayed on media in a number of circumstances. For example, a user may view a photograph of a building on their smart device screen saver and desire to know where the building is located so that they can travel to the building and view it in person. A user may view a movie on their laptop computer and may wish to know an actor's name so that they can later watch the actor's other movies. In another example, a user may wear augmented reality glasses while at a friend's house and may wish to know the name and artist of a painting hanging on the wall. In general, it will be appreciated that embodiments described herein may relate to aiding in the displaying of context of any media within any environment and for any motivation.

FIG. 1 depicts the media context display system 100, in accordance with the exemplary embodiments. According to the exemplary embodiments, the media context display system 100 may include one or more alternative reality (AR) devices 110, a smart device 120, and a media context server 130, which may all be interconnected via a network 108.

While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the media context display system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the exemplary embodiments, the AR device 110 may be a wearable device capable of overlaying/superimposing computer-generated images upon a user view of a real-world scene. In embodiments, the AR device 110 may be an augmented reality device, virtual reality device, mixed reality device, merged reality device, etc. In embodiments, the AR device 110 may include one or more sensors 112, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the AR device 110 is shown as a single device, in other embodiments, the AR device 110 may be comprised of a cluster or plurality of computing devices, in a modular manner, etc., working together or working independently. The AR device 110 is described in greater detail as a hardware implementation with reference to FIG. 4, as part of a cloud implementation with reference to FIG. 5, and/or as utilizing functional abstraction layers for processing with reference to FIG. 6.

In example embodiments, the sensors 112 may comprise a camera, microphone, light sensor, infrared sensor, movement detection sensor, pressure detection sensor, thermometer, speedometer, accelerometer, gyroscope, heart rate monitor, smell sensor, or other sensory hardware equipment. Moreover, the AR device 110 may incorporate an array of the one or more sensors 112 such that information can be obtained by the sensors 112 in multiple directions, at different times/intervals, in different mediums/frequencies, and the like. For example, the AR device 110 may be a pair of goggles that includes three forward-facing cameras that each record an adjacent sixty-degree viewing angle spanning a total of one-hundred and eighty degrees in front of a user. Moreover, data processing techniques may be implemented such that directional information of visual and audio data can be obtained based on signals received by each of the three sensors 112, such as trilateration and triangulation.

While the sensors 112 are depicted as integrated with the AR device 110, in embodiments, the sensors 112 may be incorporated within an environment in which the media context display system 100 is implemented. For example, the sensors 112 may be one or more microphones built into an auditorium, a camera built into a facility, a spectrometer, infrared thermometer, pedometer, etc. Moreover, data processing techniques may be implemented such that directional information of visual and audio data can be obtained based on signals received by each of the sensors 112, such as trilateration and triangulation. In other embodiments, the sensors 112 may be integrated with other smart devices, e.g., smart phones and laptops, within an environment implementing the media context display system 100. In such embodiments, the sensors 112 may communicate directly with other networks and devices, such as the network 108. In embodiments, the media context analyzer 134 may utilize data collected from the sensors 112 to detect media consumption and the media being consumed. The sensors 112 are described in greater detail as a hardware implementation with reference to FIG. 4, as part of a cloud implementation with reference to FIG. 5, and/or as utilizing functional abstraction layers for processing with reference to FIG. 6.

In the example embodiment, the smart device 120 includes a media context client 122, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 4, as part of a cloud implementation with reference to FIG. 5, and/or as utilizing functional abstraction layers for processing with reference to FIG. 6.

The media context client 122 may act as a client in a client-server relationship with a server, for example a media context server 130. The media context client 122 may also be a software and/or hardware application capable of communicating with and providing a user interface for a user to interact with a server via the network 108. Moreover, in the example embodiment, the media context client 122 may be capable of transferring data from the AR device 110 and/or the sensors 112 between the smart device 120 and other devices via the network 108. In embodiments, the media context client 122 utilizes various wired and wireless connection protocols for data transmission and exchange, including Bluetooth, 2.4 gHz and 5 gHz internet, near-field communication, Z-Wave, Zigbee, etc. The media context client 122 is described in greater detail with respect to FIG. 2.

In the exemplary embodiments, the media context server 130 may include one or more media context models 132 and a media context analyzer 134, and may act as a server in a client-server relationship with the media context client 122. The media context server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the media context server 130 is shown as a single device, in other embodiments, the media context server 130 may be comprised of a cluster or plurality of computing devices, working together or working independently. The media context server 130 is described in greater detail as a hardware implementation with reference to FIG. 4, as part of a cloud implementation with reference to FIG. 5, and/or as utilizing functional abstraction layers for processing with reference to FIG. 6.

The media context models 132 may be one or more algorithms modelling a correlation between one or more features detected by the sensors 112 and a media context. In the example embodiment, the media context models 132 may be generated using machine learning methods, such as neural networks, deep learning, hierarchical learning, Gaussian Mixture modelling, Hidden Markov modelling, and K-Means, K-Medoids, or Fuzzy C-Means learning, etc., and may model a likelihood of one or more features being indicative of a media's context. In embodiments, such features may include text, entities such as objects, things, people, animals, places, times, seasons, etc. The media context models 132 may weight the features based on an effect that the features have on determining the context of media.

In the exemplary embodiments, the media context analyzer 134 may be a software and/or hardware program capable of collecting training data, extracting features from the training data, and training one or more models based on the extracted features. The media context analyzer 134 may additionally be capable of configuring a session and detecting media consumption. The media context analyzer 134 may be further configured for collecting data, extracting features from the collected data, and applying one or more models to the extracted features to determine the context of media. Moreover, the media context analyzer 134 may be further configured for notifying the user of the determined media context. The media context analyzer 134 is additionally capable of evaluating whether the determined media context was appropriate and adjusting the one or more models. The media context analyzer 134 is described in greater detail with reference to FIG. 2.

Figure 2:
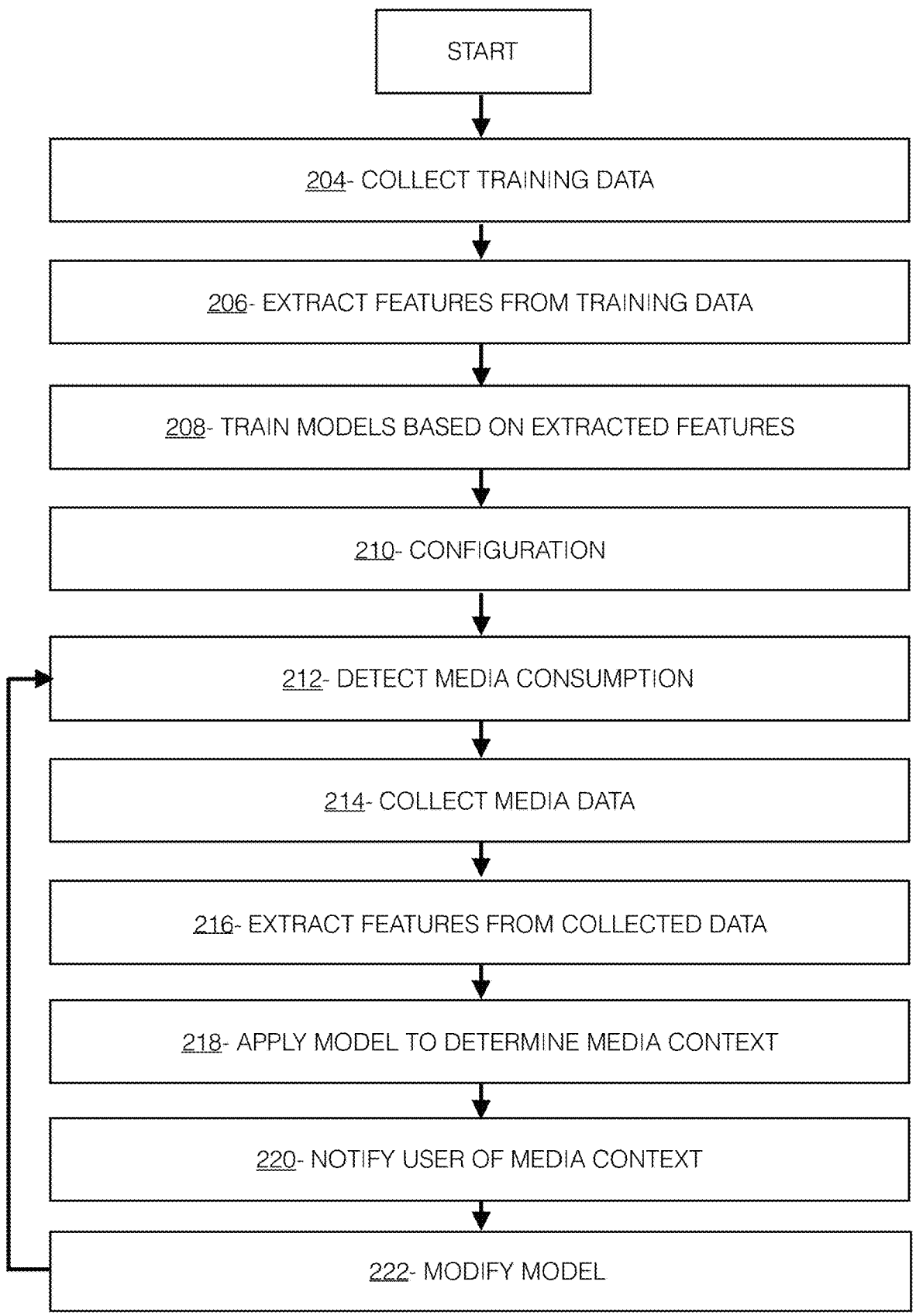
FIG. 2 depicts an exemplary flowchart illustrating the operations of a media context analyzer 134 of the media context display system 100 in displaying media context, in accordance with the exemplary embodiments.

FIG. 2 depicts an exemplary flowchart illustrating the operations of a media context analyzer 134 of the media context display system 100 in determining the context of media, in accordance with the exemplary embodiments. In exemplary embodiments, the media context analyzer 134 first implements a training phase in which it trains the media context models 132 using training data including various types of media and associated contexts of the various media. In embodiments, the media context analyzer 134 may utilize the trained media context models 132 to identify a context associated with media. In other embodiments, the media context analyzer 134 may utilize the trained media context models 132 to determine whether the user is likely to be interested in the context associated with media. In yet further embodiments, the media context analyzer 134 may utilize the trained media context models 132 to both identify the context associated with the media as well as determine whether the user is likely to be interest in the context associated with media. The media context analyzer 134 then moves on to an operational phase in which it applies the trained media context models 132 to currently consumed media in order to determine the context of the currently consumed media.

The media context analyzer 134 may collect and/or receive training data (step 204). In embodiments, training data may include media labelled with corresponding appropriate media context. For example, the media context analyzer 134 may collect an image labelled with "Place: The White House," "Person: United States President," and "Season: Autumn" as training data. The media context analyzer 134 may additionally collect an audio file labelled with "Song: Yellow Submarine," "Artist: The Beatles," "People: John Lennon, Paul McCartney, George Harrison, and Ringo Starr" as training data. In embodiments, training data may additionally include tags, keywords, metadata, hashtags, file extensions/formats, etc. of a media file. The media context analyzer 134 may retrieve training data via user upload, databases, or the sensors 112. In embodiments, the media context analyzer 134 may collect training data via the sensors 112 as one or more microphones built into an auditorium, a camera built into a facility, a smell sensor built into the AR device 110, etc. For example, video camera sensors 112 may collect video footage of a building in a user's field of vision and microphone sensors 112 may collect audio of a user saying, "This is the Empire State Building at night." The media context analyzer 134 may treat the video camera data as labelled by the microphone data, and may collect both types of data as training data. In embodiments, collected training data may also be associated to one or more users. For example, an image of Yankees Stadium may be labelled with media context, "Yankees Stadium" and "Seats up to 50,287 people," and additionally labelled with "user: James." The media context analyzer 134 may collect training data associated with specific users to later train different media context models 132 for different users based on the users' preferences and/or pre-existing knowledge of media context.

To further illustrate the operations of the media context analyzer 134, reference is now made to an illustrative example where the media context analyzer 134 collects training data consisting of various types of media labelled with corresponding contexts of the various media and corresponding users.

The media context analyzer 134 may extract one or more features from the collected and/or received training data (step 206). The extracted features may be extracted from the collected training data, which may include audio, video, etc. media as well as tags, keywords, metadata, hashtags, file extensions/formats, etc. of a media file, and may include features related to the context of the media such as text, objects, things, people, places, times, seasons, etc. In embodiments, the media context analyzer 134 may use techniques such as feature extraction, natural language processing, optical character recognition, image processing, audio processing, pattern/template matching, data comparison, etc. to identify text, objects, things, people, animals, and places of media. For example, the media context analyzer 134 may compare images, audio, and video of media with images, audio, and video of one or more databases, social networks, and the internet via network 108 to identify text, objects, things, people, and places of media. The media context analyzer 134 may utilize optical character recognition to determine that a sign in an image says, "horse crossing," and may use image processing to extract the presence of a horse and person riding the horse in the image. The media context analyzer 134 may additionally utilize image processing, audio processing, and natural language processing to extract a person's location. For example, the media context analyzer 134 may utilize image processing to extract the presence of a particular person and may utilize image processing, audio processing, and natural language processing to extract his location as Yankee Stadium. Alternatively, the media context analyzer 134 may identify location based on GPS coordinates identified within the metadata, i.e., a geotag, or transmitted by a smart device at a time of upload, etc. In embodiments, the media context analyzer 134 may extract text, objects, things, people, animals, locations, and places directly from tags, keywords, metadata, hashtags, etc. of collected media files.

In addition to extracting features such as text, objects, things, people, places, etc., the media context analyzer 134 may also extract times, dates, seasons, etc. of media (step 206 continued). In embodiments, the media context analyzer 134 may use techniques such as feature extraction, natural language processing, optical character recognition, image processing, audio processing, pattern/template matching, data comparison, etc. to identify times and seasons of media. For example, if an image shows a clock displaying 8:30 pm and natural light from a sunset, the media context analyzer 134 may extract the season as summer, time as 8:30 μm, and time of day as sunset. Alternatively, if a video shows trees with orange and yellow leaves, the media context analyzer 134 may extract the season as autumn, or if a photo shows snow, the media context analyzer 134 may extract the season as winter. The media context analyzer 134 may additionally extract a time as a year, month, and/or day (or any year, month, and/or day range) of a media based on image processing, audio processing, etc. For example, if an image shows the Anaheim Ducks celebrating on ice with the Stanley Cup, the media context analyzer 134 may extract the time Jun. 6, 2007. If a different image shows the Anaheim Ducks playing against the Ottawa Senators in the Stanley Cup Finals, the media context analyzer 134 may extract the time as a range from May-June, 2007. In embodiments, the media context analyzer 134 may extract times and seasons directly from tags, keywords, metadata, hashtags, etc. of collected media files, and/or from the internet via network 108.

With reference to the previously introduced example where the media context analyzer 134 collects training data consisting of various types of media labelled with corresponding contexts of the various media and corresponding users, the media context analyzer 134 extracts features such as text, objects, things, people, animals, places, times, and seasons from the collected training data with respect to each labelled media.

The media context analyzer 134 may train one or more media context models 132 based on the extracted features (step 208). The media context analyzer 134 may train one or more media context models 132 based on an association of the one or more extracted features with labelled media contexts. As previously mentioned, such extracted features may include text, objects, things, people, animals, places, times, seasons, etc. of media, and the one or more media context models 132 may be generated through machine learning techniques such as neural networks. Moreover, the media context analyzer 134 may train the one or more media context models 132 to weight the features such that features shown to have a greater correlation with an appropriate media context are weighted greater than those features that are not. As previously mentioned, the trained media context models 132 identify the context associated with the media, determine whether the user is likely to be interest in the context associated with media, or both. Moreover, the media context analyzer 134 may train different media context models 132 for different users based on user preferences. With reference to the former, the media context analyzer 134 may utilize the trained media context models 132 to identify context based on the extracted features, for example identifying a context using a combination of weighted image, text, and audio analysis. With reference to the latter, the media context analyzer 134 may utilize the trained media context models 132 to determine whether the context is likely to be of interest to the user, for example identifying a user interest level based on previous interactions with the extracted features and user preferences. Based on the media context models 132's extracted features and weights associated with such extracted features, the media context analyzer 134 may later determine the context and/or user interest level of consumed media.

With reference to the previously introduced example where the media context analyzer 134 extracts features such as text, objects, things, people, animals, places, times, and seasons from the collected training data with respect to each labelled media, the media context analyzer 134 trains a model for each labelled user of the collected training data based on an association of the extracted features with the labelled media contexts.

The media context analyzer 134 may receive a configuration (step 210). The media context analyzer 134 may receive a configuration by receiving a user registration and user preferences. The user registration may be uploaded by a user, i.e., a person consuming media or wearing the AR device 110 of the media context display system 100, and the configuration may be received by the media context analyzer 134 via the media context client 122 and the network 108. Receiving the user registration may involve referencing a user profile via user login credentials, internet protocol (IP) address, media access control (MAC) address, etc., or receiving user input information such as a name, date of birth, gender, address/geographic information, phone number, email address, company name, device serial number, smart device 120 type, a type of the AR device 110, types of the sensors 112, and the like. Lastly, the media context analyzer 134 may receive a configuration of the one or more sensors 112, whether they be fixed to one or more devices (e.g., the smart device 120 or the AR device 110) or fixed within an environment in which the media context display system 100 is implemented.

During configuration, the media context analyzer 134 may further receive user preferences (step 210 continued). User preferences may include preferences for the manner in which the media context analyzer 134 should notify the user of determined media context. User preferences may additionally include preferences for the media context analyzer 134 to notify the user via audio and/or video feedback, and when to do so. For example, a user may upload user preferences for notification of media context via both audio and video feedback when viewing images. A user may upload user preferences for notification of media context via audio feedback upon the user pausing video media.

With reference to the previously introduced example where the media context analyzer 134 trains a model based on an association of the extracted features with the labelled training data media contexts, the user uploads a user registration including the user's name and user's computer as smart device 120. The user also uploads user preferences specifying that notification of media context is to be communicated to the user via video overlay on the upper right corner of the consumed media.

The media context analyzer 134 may detect media consumption (step 212). In embodiments, the media context analyzer 134 may detect media consumption via integration of the media context client 122 with the operating system of smart device 120. For example, the media context analyzer 134 may detect media consumption when a user opens an image file, video file, video player, etc. or when an image or video is displayed on a user's smart device 120 screen. In some embodiments, the media context analyzer 134 may detect media consumption from data collected from the sensors 112. For example, if a video camera sensor 112 of a user's AR device 110 captures footage of a significant landmark, place, person, object, etc., the media context analyzer 134 may detect the capturing of that footage as the commencement of media consumption by the user.

Figure 3:
FIG. 3 depicts exemplary media content and context, illustrating the operations of a media context analyzer 134 of the media context display system 100 in displaying media context, in accordance with the exemplary embodiments.

With reference to the previously introduced example where the user uploads a user registration and user preferences and additionally with reference to FIG. 3, the media context analyzer 134 detects the user opening an image file on their computer.

The media context analyzer 134 may collect media data (step 214). The media data may include the media consumed by the user as well as any tags, keywords, metadata, hashtags, file extensions/formats, etc. of the media consumed by the user, and the context analyzer 134 may retrieve media data via user upload, databases, integration of the media context client 122 with the operating system of smart device 120, or the sensors 112. In embodiments, the media context analyzer 134 may collect media data via the sensors 112 as one or more microphones built into an auditorium, a camera built into a facility, a smell sensor built into the AR device 110, etc. For example, video camera sensors 112 may collect video footage of a building in a user's field of vision and microphone sensors 112 may collect audio of the user saying, "I wonder when that building was built." The media context analyzer 134 may collect both the video camera and microphone data to determine that the user is focused on the building in the user's field of vision, and may treat the video footage of the building in the user's field of vision as the media being consumed by the user. The media context analyzer 134 may collect media data to later extract features of the media data and apply one or more media context models 132 to determine appropriate media context.

With reference to the previously introduced example where the media context analyzer 134 detects the user opening an image file on their computer, the media context analyzer 134 collects the image file and the tags, keywords, metadata, and hashtags of the image file. In addition, the media context analyzer 134 captures user gestures and expressions as the user views the image.

The media context analyzer 134 may extract one or more features from the collected media data (step 216). The media context analyzer 134 may extract one or more features from the collected media data in the same manner as described above with respect to extracting features from the training data.

With reference to the previously introduced example where the media context analyzer 134 collects the image file and the tags, keywords, metadata, and hashtags of the image file, and additionally with reference to FIG. 3, the media context analyzer 134 extracts features of the image listed in Table 1 below.

TABLE 1

| | |
|---|---|
| object | Sydney Opera House |
| object | Buildings |
| object | Trees |
| place | Bennelong Point |
| place | Sydney, Australia |

TABLE 1-continued

| | |
|---|---|
| time | As on 2 Nov. 2018 |
| season | Autumn |

The media context analyzer 134 may apply one or more models to the extracted features to determine an appropriate context of the consumed media to be displayed and/or a user interest level (step 218). As previously mentioned, such extracted features may include text, objects, things, people, animals, places, times, seasons, etc. and the one or more media context models 132 may be generated through machine learning techniques such as neural networks. In embodiments, the one or more media context models 132 may be trained at initialization and/or through the use of a feedback loop to weight the features such that features shown to have a greater correlation with determining appropriate media context and/or identifying a user interest level are weighted greater than those features that are not. Based on the extracted features and weights associated with such extracted features, the media context analyzer 134 may determine the appropriate contextual information to be conveyed to the user as well as when the user may be interested in such context. In embodiments, the media context analyzer 134 may determine that various information and/or metadata associated with an extracted feature on the internet is to be included in the appropriate contextual information to be conveyed to a user. For example, if a user is viewing an image of the Statue of Liberty, the media context analyzer 134 may determine that a website link to National Park Services, is appropriate contextual information. The media context analyzer 134 may additionally determine that nicknames for the Statue of Liberty such as "Lady Liberty" and "The Lady in the Harbor" are appropriate contextual information to convey to the user.

With reference to the previously introduced example where the media context analyzer 134 extracts features of the image, and additionally with reference to FIG. 3, the media context analyzer 134 determines the media context to be displayed to the user in Table 2 below.

TABLE 2

| |
|---|
| Sydney Opera House |
| Sydney, Australia |
| As on 2 Nov. 2018 |

Upon the media context analyzer 134 determining the appropriate media context to be displayed to the user, the media context analyzer 134 may notify the user of the determined appropriate media context (step 220). The media context analyzer 134 may convey the media context to the user in the form of audio, video, text, or any other manner via the smart device 120, AR device 110, or any other device. The media context analyzer 134 may illustrate media context via overlay within a display of the AR device 110. In addition, media context may be conveyed audially via one or more integrated speakers. As previously discussed, the media context analyzer 134 may notify the user of the media context according to a user interest level and/or the user preferences of configuration. For example, if a user interest level for a media context is determined to be greater than or equal to 50%, the media context analyzer 134 may display the media context. If a user interest level for a media context is determined to be less than 50%, the media context analyzer 134 may not display the media context. In embodiments, the media context analyzer 134 may be configured for receiving user input acknowledging, dismissing, and/or affirming that the media context is appropriate.

With reference to the previously introduced example where the media context analyzer 134 determines that "Sydney Opera House," "Sydney, Australia," and "As on 2 Nov. 2018" is the appropriate media context, and additionally with reference to FIG. 3, the media context analyzer 134 displays "Sydney Opera House," "Sydney, Australia," and "As on 2 Nov. 2018" to the user in the top right corner of the image according to the user's preferences.

The media context analyzer 134 may evaluate and modify the media context models 132 (step 222). In the example embodiment, the media context analyzer 134 may verify whether the media context was properly determined in order to provide a feedback loop for modifying the media context models 132. In embodiments, the feedback loop may simply provide a means for a user to indicate whether the media context was appropriate, helpful, interesting, etc. The feedback loop indication may be triggered via a toggle switch, button, slider, etc. that may be selected by the user manually by hand using a button/touchscreen/etc., by voice, by eye movement, and the like. Based on the media context analyzer 134 appropriately or inappropriately determining a media's context, the media context analyzer 134 may modify the media context models 132 relating to identification of a media context. Based on the media context analyzer 134 appropriately or inappropriately determining a user interest level in the media's context, the media context analyzer 134 may modify the media context models 132 with respect to determining user interest level. In other embodiments, the media context analyzer 134 may infer or deduce whether the media context was appropriate. For example, the media context analyzer 134 may interpret user dialogue via natural language processing to determine whether the media context was reasonable. For example, if the user says, "That doesn't make sense" or other expressions indicative of confusion or dissatisfaction, the media context analyzer 134 may infer that the media context was inappropriate and modify the media context models 132 accordingly. In another example, if a user proceeds to do independent research on the context of the media, the context analyzer 134 may infer the user is interested in the media context and modify the media context models 132 accordingly. Based on feedback received in the above or any other manners, the media context analyzer 134 may then modify the media context models 132 to more accurately determine media context.

With reference to the previously introduced example where the media context analyzer 134 displays "Sydney Opera House," "Sydney, Australia," and "As on 2 Nov. 2018" to the user in the top right corner of the image according to the user's preferences, the user says, "That is helpful" and the media context analyzer 134 modifies the media context models 132 accordingly.

FIG. 3 depicts exemplary media content and context, illustrating the operations of a media context analyzer 134 of the media context display system 100 in displaying media context, in accordance with the exemplary embodiments.

Figure 4:
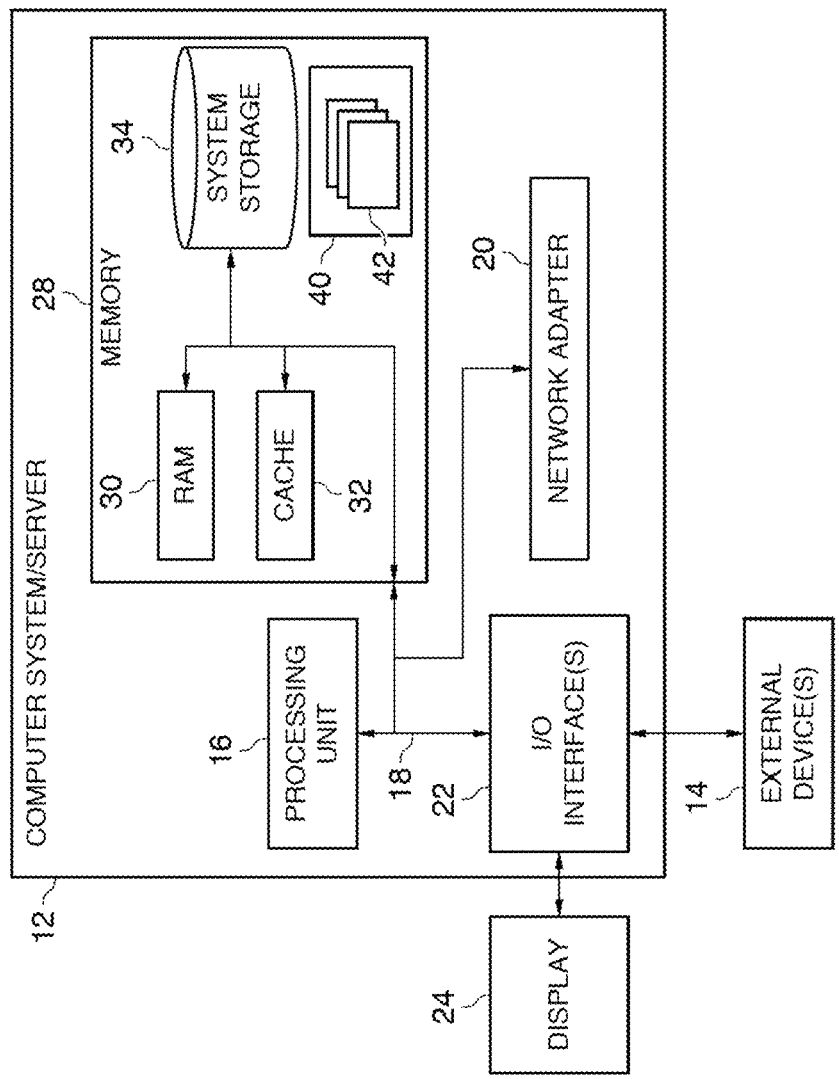
FIG. 4 depicts an exemplary block diagram depicting the hardware components of the media context display system 100 of FIG. 1, in accordance with the exemplary embodiments.

FIG. 4 depicts a block diagram of devices within the media context display system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include a computer system/server 12 that includes one or more processing units 16, one or more computer-readable RAMs 30, one or more computer-readable ROMs, one or more computer readable storage media, device drivers, cache 32, system storage 34 storing one or more operating systems 40 that includes one or more application programs 42, read/write drive or I/O interface 22, network adapter 20 or interface, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems and one or more application programs are stored on one or more of the computer readable storage media for execution by one or more of the processing units 16 via one or more of the respective RAMs 30 (which typically include cache memory 32). In the illustrated embodiment, each of the computer readable storage media may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or I/O interface 22 to read from and write to one or more portable computer readable storage media. Application programs on said devices may be stored on one or more of the portable computer readable storage media, read via the respective R/W drive or I/O interface 22 and loaded into the respective computer readable storage media.

Devices used herein may also include a network adapter or interface 20, such as a TCP/IP adapter card or wireless communication adapter (such as a 4G wireless communication adapter using OFDMA technology). Application programs 42 on said computing devices may be downloaded to the computing device from an external computer or external storage device via a network (for example, the Internet, a local area network or other wide area network or wireless network) and network adapter 20 or I/O interface 22. From the network adapter 20 or I/O interface 22, the programs may be loaded onto computer readable storage media. The network may comprise copper wires, optical fibers, wireless transmission, routers, firewalls, switches, gateway computers and/or edge servers.

Devices used herein may also include a display screen 24 and external devices that include a keyboard or keypad and a computer mouse or touchpad. Device drivers interface to display screen 24 for imaging, to external devices such as keyboard or keypad and to computer mouse or touchpad, and/or to display screen 24 for pressure sensing of alphanumeric character entry and user selections. The device drivers, R/W drive or I/O interface 22 and network adapter 20 or interface may comprise hardware and software (stored on computer readable storage media and/or ROM).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
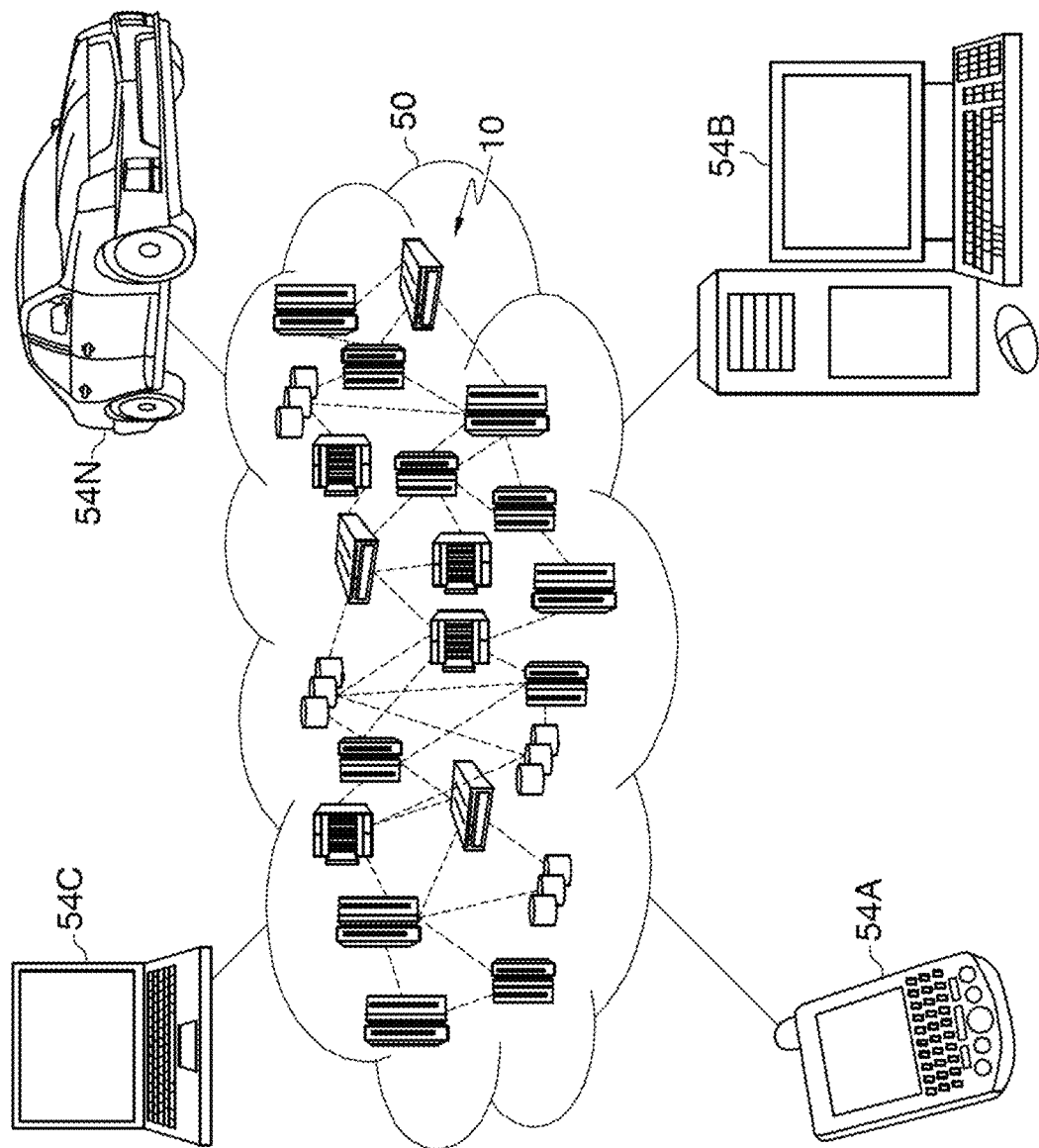
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
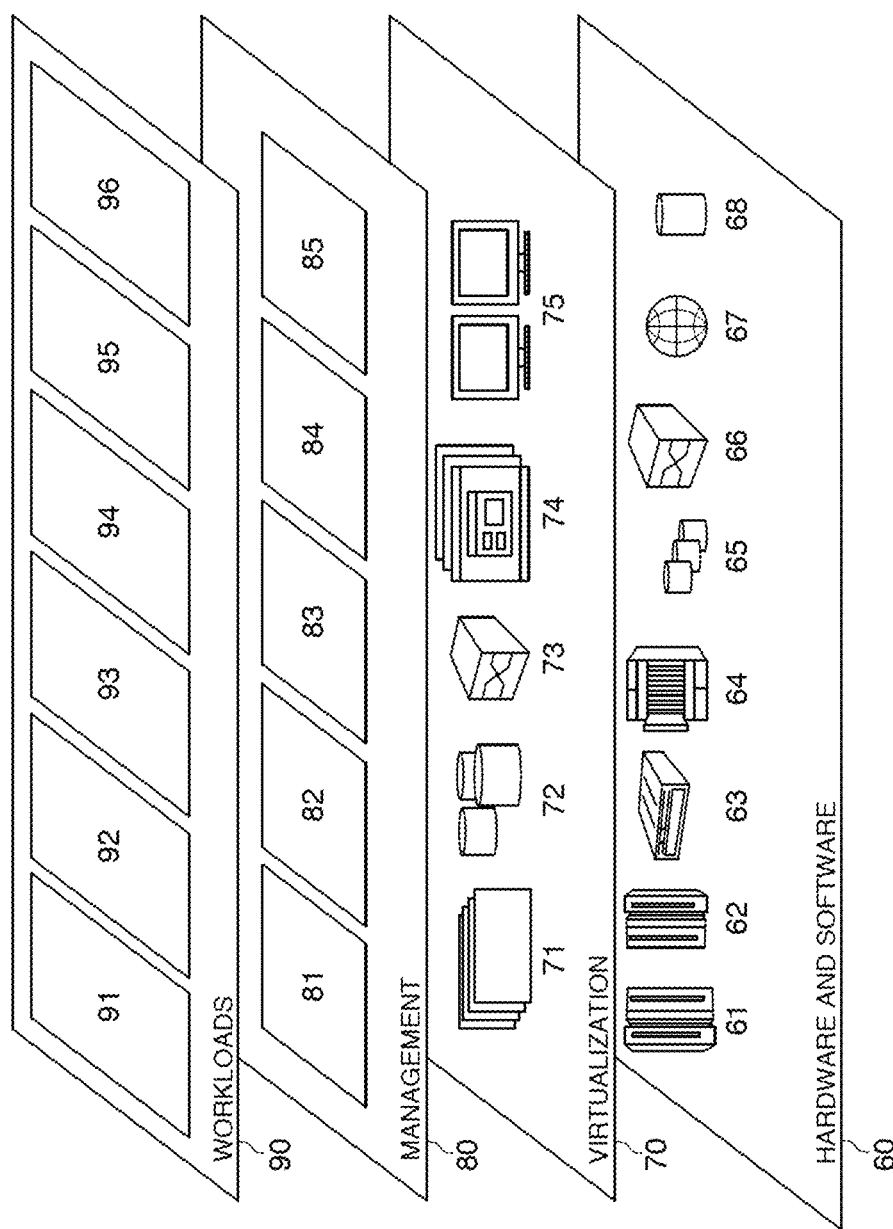
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and media context determination 96.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
receiving, via at least one sensor communicatively connected to an augmented reality device, sensory information comprising at least one of sounds and sights, the sensory information being consumed via a first user wearing the augmented reality device;
extracting, via a first machine learning model, one or more features from the received sensory information;
determining a sensory information context based on the extracted one or more features and a second machine learning model that analyzes the extracted one or more features as input, the sensory information context comprising one or more words describing a name of at least one object captured in or represented by the sensory information and a location of the at least one object;
determining a user interest level of the first user for the sensory information context based on inputting the sensory information context into a third machine learning model, the third machine learning model having been trained on prior user interaction data generated from interactions of the first user with other data;
in response to the user interest level exceeding a threshold, presenting via an output component of the augmented reality device, the determined sensory information context including the one or more words describing the name of the at least one object and the location;
receiving, via the augmented reality device, feedback indicative of whether the determined sensory information context was appropriate; and
adjusting the second machine learning model based on the received feedback.

2. The method of claim 1, wherein the second machine learning model correlates the one or more features with a likelihood of determining an appropriate sensory information context.

3. The method of claim 1, further comprising:
collecting training data;
extracting, via the first machine learning model, training features from the training data; and
training the second machine learning model based on the extracted training features.

4. The method of claim 1, further comprising collecting data related to the sensory information, wherein the collected data includes one or more items selected from a group consisting of tags, keywords, metadata, hashtags, file extensions, and formats, and wherein the determining the sensory information context is further based on inputting the collected data into the second machine learning model.

5. The method of claim 1, wherein the one or more features are selected from a group consisting of text, objects, things, people, animals, places, times, and seasons.

6. The method of claim 1, further comprising:
receiving additional feedback regarding accuracy of the user interest level determined via the third machine learning model; and
updating the third machine learning model based on the additional feedback.

7. The method of claim 1, further comprising:
producing training data by:
receiving video data capturing a first object;
receiving audio data capturing words related to the first object;
using the captured words as labels for the received video data to produce the training data; and
training a base machine learning model with the training data such that the second machine learning model is produced.

8. The method of claim 1, wherein the extracted one or more features comprise GPS coordinates associated with an origin of the at least one of the sounds and the sights, and the second machine learning model determines the location of the at least one object via using the GPS coordinates.

9. The method of claim 1, wherein the second machine learning model uses image processing, audio processing, and natural language processing to determine the location of the at least one object via analyzing the extracted one or more features.

10. The method of claim 1, wherein the at least one sensor comprises at least one of a camera and a microphone integrated with the augmented reality device, and wherein the output component comprises at least one of a speaker and an augmented reality display screen.

11. The method of claim 10, wherein the at least one sensor comprises multiple cameras integrated at distributed angles in the augmented reality device.

12. A computer program product comprising:
one or more non-transitory computer-readable storage media and program instructions stored on the one or more non-transitory computer-readable storage media that when executed by a processor cause the processor to perform computer operations comprising:
receiving, via at least one sensor communicatively connected to an augmented reality device, sensory information comprising at least one of sounds and sights, the sensory information being consumed via a first user wearing the augmented reality device;

extracting, via a first machine learning model, one or more features from the received sensory information;

determining a sensory information context based on the extracted one or more features and a second machine learning model that analyzes the extracted one or more features as input, the sensory information context comprising one or more words describing a name of at least one object captured in or represented by the sensory information and a location of the at least one object;

determining a user interest level of the first user for the sensory information context based on inputting the sensory information context into a third machine learning model, the third machine learning model having been trained on prior user interaction data generated from interactions of the first user with other data;

in response to the user interest level exceeding a threshold, presenting via an output component of the augmented reality device the determined sensory information context including the one or more words describing the name of the at least one object and the location;

receiving, via the augmented reality device, feedback indicative of whether the determined sensory information context was appropriate; and adjusting the second machine learning model based on the received feedback.

13. The computer program product of claim 12, wherein the one or more features are selected from a group consisting of text, objects, things, people, animals, places, times, and seasons.

14. The computer program product of claim 12, wherein the computer operations further comprise:

receiving additional feedback regarding accuracy of the user interest level determined via the third machine learning model; and updating the third machine learning model based on the additional feedback.

15. The computer program product of claim 12, wherein the computer operations further comprise:

producing training data by:
  receiving video data capturing a first object;
  receiving audio data capturing words related to the first object;
  using the captured words as labels for the received video data to produce the training data; and
  training a base machine learning model with the training data such that the second machine learning model is produced.

16. An augmented reality device comprising:

one or more computer processors, one or more computer-readable storage media, an output component, and program instructions stored on the one or more of the computer-readable storage media for execution by at least one of the one or more computer processors to cause the at least one of the one or more computer processors to perform operations comprising:

receiving, via at least one sensor communicatively connected to the augmented reality device, sensory information comprising at least one of sounds and sights, the sensory information being consumed via a first user wearing the augmented reality device;

extracting, via a first machine learning model, one or more features from the received sensory information;

determining a sensory information context, based on the extracted one or more features and a second machine learning model that analyzes the extracted one or more features as input, the sensory information context comprising one or more words describing a name of at least one object captured in or represented by the sensory information and a location of the at least one object;

determining a user interest level of the first user for the sensory information context based on inputting the sensory information context into a third machine learning model, the third machine learning model having been trained on prior user interaction data generated from interactions of the first user with other data;

in response to the user interest level exceeding a threshold, presenting via the output component the determined sensory information context including the one or more words describing the name of the at least one object and the location;

receiving, via the augmented reality device, feedback indicative of whether the determined sensory information context was appropriate; and adjusting the second machine learning model based on the received feedback.

17. The augmented reality device of claim 16, wherein the second machine learning model correlates the one or more features with a likelihood of determining an appropriate sensory information context.

18. The augmented reality device of claim 16, wherein the operations further comprise:

collecting training data;
extracting, via the first machine learning model, training features from the training data; and
training the second machine learning model based on the extracted training features.

19. The augmented reality device of claim 16, wherein the operations further comprise:

producing training data by:
  receiving video data capturing a first object;
  receiving audio data capturing words related to the first object;
  using the captured words as labels for the received video data to produce the training data; and
  training a base machine learning model with the training data such that the second machine learning model is produced.

20. The augmented reality device of claim 16, further comprising the at least one sensor, wherein the at least one sensor comprises at least one of a camera and a microphone integrated with the augmented reality device, and wherein the output component comprises at least one of a speaker and an augmented reality display screen.

* * * * *